June 10, 1969  W. A. GEYGER  3,449,665
PERPENDICULAR-MAGNETIZATION TYPE MAGNETOMETER USING
A CORE WOUND OF FERROMAGNETIC TAPE
Filed June 11, 1965
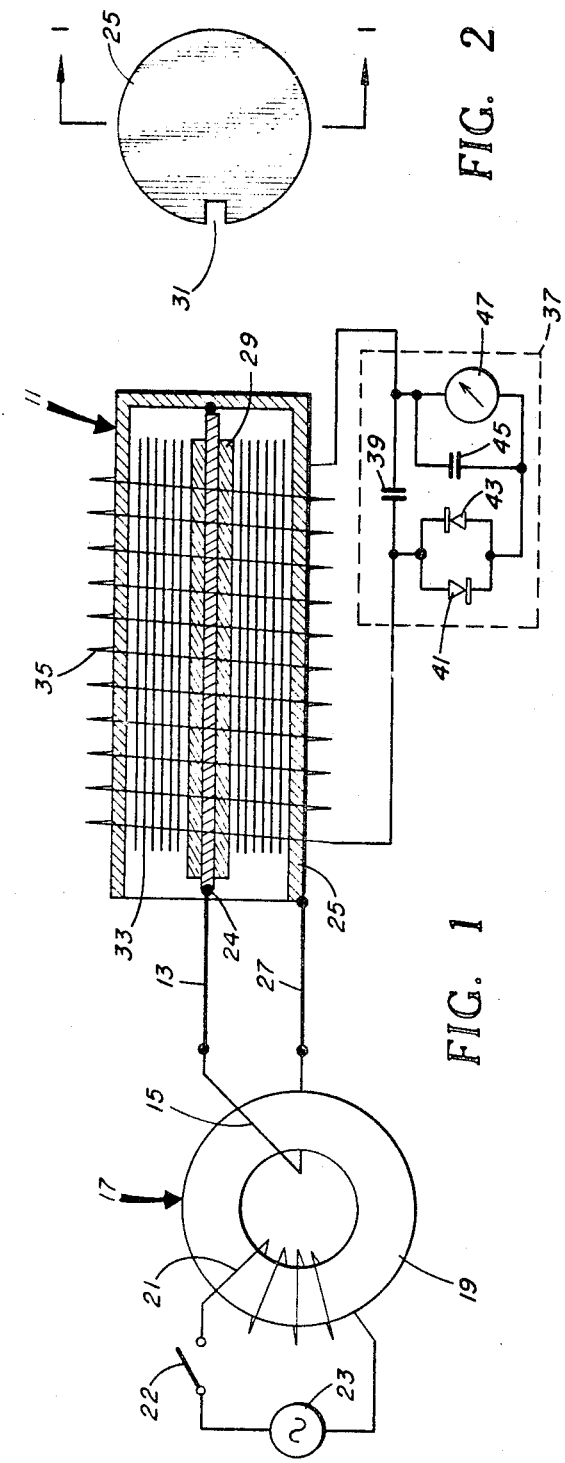
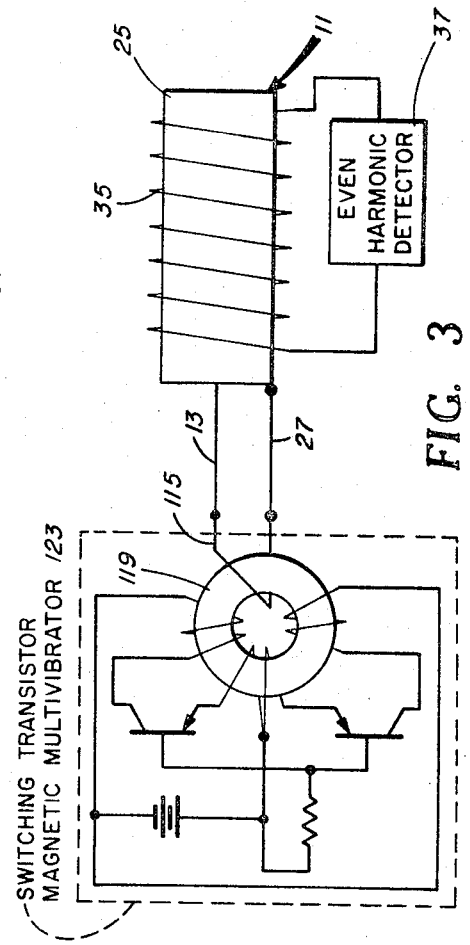
INVENTOR
William A. Geyger, DECEASED,
BY Ella Geyger, EXECUTRIX.
BY
ATTORNEY ically magnetizable tape wound core made of high permeability core material. The width of the tape material is unusually large, that is, in the neighborhood of 2½ to 3" wide and large in comparison to the diameter of the core when wound. A slotted copper cylinder conductor is placed over the core and a single winding primary conductor runs through the center of the core and connects to the slotted copper cylinder. This primary circuit is directly connected to a single turn secondary of a current transformer. The magnetometer is designated as the perpendicular magnetization type since the secondary or detector winding is perpendicular to the primary winding and is wound on the copper cylinder conductor. The output circuit of the secondary or detector winding is applied to an even harmonic or second harmonic detector circuit from which the magnitude of the magnetic field to be measured is obtained.

United States Patent Office 3,449,665
Patented June 10, 1969

3,449,665
PERPENDICULAR-MAGNETIZATION TYPE MAGNETOMETER USING A CORE WOUND OF FERROMAGNETIC TAPE
William A. Geyger, deceased, late of Takoma Park, Md., by Ella Geyger, executrix, Takoma Park, Md., assignor to the United States of America as represented by the Secretary of the Navy
Filed June 11, 1965, Ser. No. 463,406
Int. Cl. G01r 33/02
U.S. Cl. 324—47                                          6 Claims

ABSTRACT OF THE DISCLOSURE

A perpendicular-magnetization type magnetometer employing a magnetic tape wound core of high permeability material. A slotted copper cylinder conductor is placed over the core and a single winding primary conductor runs through the center thereof and connects to the slotted copper cylinder. The primary circuit is directly connected to a single turn secondary of a current transformer. The secondary or detector winding of the perpendicular-magnetized tape core is perpendicular to the primary winding and is wound on the copper cylinder conductor. The output circuit of the secondary or detector winding is applied to an even harmonic detector circuit from which the magnitude of an external magnetic field to be measured is obtained.

---

The invention described herein may be manufactured and used by or for the Government of the United States of America for governmental purposes without the payment of any royalties thereon or therefor.

This invention relates to magnetometers and more particularly to a perpendicular magnetization type magnetometer employing a single turn primary winding and a wide magnetic tape wound core.

This invention provides a highly sensitive, reliable, and rugged magnetometer for remote applications, particularly in earth-satellites and interplanetary probes which have extremely low power requirements.

In the past, perpendicular magnetization type of magnetometers (as defined below) normally employed a thick wall ferrite tube core or a thin wall permalloy tube core as for example in the U.S. Patent No. 2,856,581 to L. R. Alldredge issued Oct. 14, 1958. In such prior art devices, the sensitivity is limited by the restriction of the core material to such types as a ferrite core or to thin wall high permeability type tapes. With this limitation imposed, the resistance of the primary A.C. excitation circuit is not minimized.

The present invention makes use of the principle of a perpendicular

It is an object of this invention to provide a perpendicular magnetization type magnetometer employing a wide tape wound core and a single primary winding primary circuit.

It is another object of this invention to provide a perpendicular magnetization type magnetometer in which a tape wound core surrounds a single turn primary energizing winding to provide a magnetometer with increased sensitivity.

It is yet another object of this invention to provide a perpendicular magnetization type magnetometer with a single turn primary winding and a wide tape wound core for increased sensitivity of the magnetometer circuit.

Other objects and many of the attendant advantages of this invention will be readily appreciated as the same becomes better understood by reference to the following detailed description when considered in connection with the accompanying drawings wherein:

FIG. 1 of the drawing illustrates the circuit and structure of an embodiment of the instant invention;

FIG. 2 of the drawing is an end view of the copper cylindrical covering of an embodiment of this invention; and FIG. 3 of the drawing illustrates the circuitry of this invention in which a switching transistor magnetic multivibrator is employed as a source of an A.C. voltage.

Referring now to FIG. 1 of the drawing, magnetometer 11 is provided with the single turn primary winding 13 which connects to the single turn winding 15 of the current transformer 17. Current transformer 17 is shown having a core 19 and a primary winding 21 wound therearound. Primary winding 21 of the current transformer 17 may be connected to an A.C. voltage source 23. The single turn primary winding 13 of magnetometer 11 is conductively connected to the end portion of slotted copper cylinder 24. The primary circuit is completed by the connection of a conductor 27 connecting the open end of slotted copper cylinder 25 to the single turn secondary winding 15 of the current transformer 17. A ceramic tube 29 is provided which surrounds the single turn primary winding 13. Copper cylinder 25 is provided with one or more slots 31 which run the entire length of the copper cylinder. Such a slot or slots provide for prevention of a short circuit of the secondary winding of the magnetometer. A wide tape core is wound around the ceramic tube 29 to substantially fill the space between ceramic tube and the inside diameter of the copper cylinder 25. A secondary winding 35 is wound around the copper cylinder 25 and connected to an even harmonic detector circuit 37.

Referring now to FIG. 2 of the drawing in which an end view of the copper cylinder 25 is shown with the secondary winding removed therefrom, slot 31 is illustrated running the entire length of the cylinder.

Referring now to FIGS. 1 and 2 of the drawing for the operation of the magnetometer circuit of this invention, current transformer 17 is energized by an A.C. voltage source 23 when switch 22 is closed. The A.C. voltage source 23 may be any suitable source of A.C. voltage. When the current transformer 17 is energized, a current flows in secondary winding 15 as a result of an induced voltage being developed therein. Current will now flow through primary winding 13 and through the copper cylinder 25 and back through conductor 27 to the secondary winding 15 of current transformer 17. The flow of an A.C. current in primary winding 13 will cause an A.C. magnetic field to be developed in tape wound core 33. When the magnetometer 11 is placed in a magnetic field to be measured and the magnetometer is thus energized, a D.C. magnetic field will be present within the tape wound core 33 in addition to the A.C.

magnetic field created as a result of current flow in primary winding 13. The combination of the D.C. magnetic field within the core 33 and the A.C. magnetic field will cause an A.C. voltage to be induced in secondary winding 35 which contains the second harmonic frequency of A.C. voltage source 23. The second harmonic voltage thus developed in the secondary winding 35 when primary winding 13 is energized and the magnetometer is placed in a D.C. field to be measured is connected to an even harmonic detector circuit 37. This even harmonic detector circuit will rectify the second harmonic voltage produced in winding 35 and produce an output voltage which has a polarity indicative of the direction of the magnetic field and a magnitude indicative of the magnitude of the field to be measured. The even harmonic detector 37 may comprise the capacitor 39, diodes 41 and 43, capacitor 45, and meter 47. Other types of phase sensitive detectors may be used in the output circuit of the secondary or detector winding 35 if desired without departing from the scope of this invention.

Referring now to FIG. 3 of the drawing an embodiment of this invention is shown in which a switching transistor magnetic multivibrator is used as a combination A.C. voltage source and current transformer for the magnetometer of this invention. Magnetometer 11 is shown having a cenral conductor or primary winding 13, a slotted copper cylinder 25, and a conductor 27. Secondary winding 35 is shown connected to the even harmonic detector circuit 37. In this embodiment, a single turn secondary winding 115 is shown on core 119 of the switching transistor magnetic multivibrator 123. With such an arrangement the output transformer of the switching transistor magnetic multivibrator is combined wih the current transformer to form a unique portable power source for remotely operated applications such as in earth-satellites and interplanetary probes where extremely low power drain requirements are a necessity.

What is claimed as new and desired to be secured by Letters Patent of the United States is:

1. A magnetometer comprising a core wound of ferromagnetic tape,
    a single turn primary conductor disposed within said core,
    a ceramic tube between said conductor a said core,
    a slotted copper cylinder surrounding said core, said cylinder being closed at one end thereof and open at the other end thereof,
    an A.C. voltage source,
    means connecting said A.C. voltage source to one end of said primary conductor and to the open end of said copper cylinder,
    means conductively connecting the other end of said primary conductor to the closed end of said cylinder whereby current may flow in the primary winding to energize said magnetometer,
    a secondary winding wound circumferentially around said cylinder and disposed along the length thereof
    a second harmonic detector circuit connected to said secondary winding whereby the second harmonic voltages induced in said secondary winding, when said magnetometer is energized and placed in a magnetic field, may be measured.

2. A magnetometer as is in claim 1 in which said A.C. voltage source is a switching transistor magnetic multivibrator.

3. A perpendicular magnetization type magnetometer comprising,
    a linearly disposed single conductor primary winding,
    a ceramic sleeve disposed about said primary winding,
    a ferromagnetic tape core wound around said sleeve, said core having a length several times the outer diameter of the core when wound,
    a copper cylinder covering said core, said cylinder being slotted the entire length thereof and having one open end and one closed end,
    a secondary winding wound circumferentially around said cylinder and disposed along substantially the entire length thereof,
    a second harmonic detector connected to said secondary winding,
    a current transformer comprising a saturable core, a primary winding and a single turn secondary winding thereon,
    means connecting said secondary winding to the primary winding of said magnetometer,
    an A.C. voltage source,
    means connecting said A.C. voltage source to the primary winding of said current transformer whereby said magnetometer may be energized.

4. A magnetometer as in claim 3 in which said current transformer and said A.C. voltage source are part of a switching transistor magnetic multivibrator.

5. A second harmonic detector as in claim 1 in which said second harmonic detector comprises,
    a first capacitor across said secondary winding,
    a phase sensitive detector comprising first and second diodes each diode having an anode and a cathode, the cathode of said first diode being connected to the anode of said second diode and anode of said first diode connected to the cathode of said second diode,
    an electrical meter,
    means serially connecting said phase sensitive detector and said meter across said secondary winding,
    a second capacitor connected across said meter.

6. A perpendicularly magnetizable magnetometer comprising,
    a cylindrical core wound of ferromagnetic tape the length of said core being several times as large as the diameter of said core,
    a cylinder surrounding said core, said cylinder being made of conductive material and having a closed end and an open end,
    a rod of conductive material disposed within said core and insulated therefrom, one end of said rod being conductively fused to the closed end of said cylinder, said rod forming the primary winding of said magnetometer,
    a secondary winding wound circumferentially on said cylinder and disposed along the length thereof,
    a current transformer having a saturable core, a primary winding and a secondary winding,
    means connecting the secondary winding of said current transformer to the other end of said rod and to the open end of said cylinder,
    an A.C. voltage source,
    means connecting the primary winding of said current transformer to said A.C. voltage source whereby said magnetometer may be energized,
    second harmonic detector means connected to the secondary winding of said magnetometer whereby the strength of a magnetic field may be measured.

References Cited

UNITED STATES PATENTS

| | | | |
|---|---|---|---|
| 2,446,939 | 8/1948 | MacCallum | 324—43 |
| 2,543,843 | 3/1951 | Frosch | 324—43 |
| 3,040,248 | 6/1962 | Geyger | 324—43 |
| 2,856,581 | 10/1958 | Alldredge | 324—43 |
| 3,166,707 | 1/1965 | Bonnet et al. | 324—43 |
| 3,168,696 | 2/1965 | Schonstedt | 324—43 |

OTHER REFERENCES

Geyger, W. A.: Flux Gate Magnetometer Uses Toroidal Core, Electronics, June 2, 1962, pp. 48–52.

RUDOLPH V. ROLINEC, *Primary Examiner.*

R. J. CORCORAN, *Assistant Examiner.*